No. 695,167. Patented Mar. 11, 1902.
J. C. F. McGRIFF.
COMBINATION LIQUID MEASURE AND STERILIZER.
(Application filed Mar. 29, 1901.)
(No Model.)
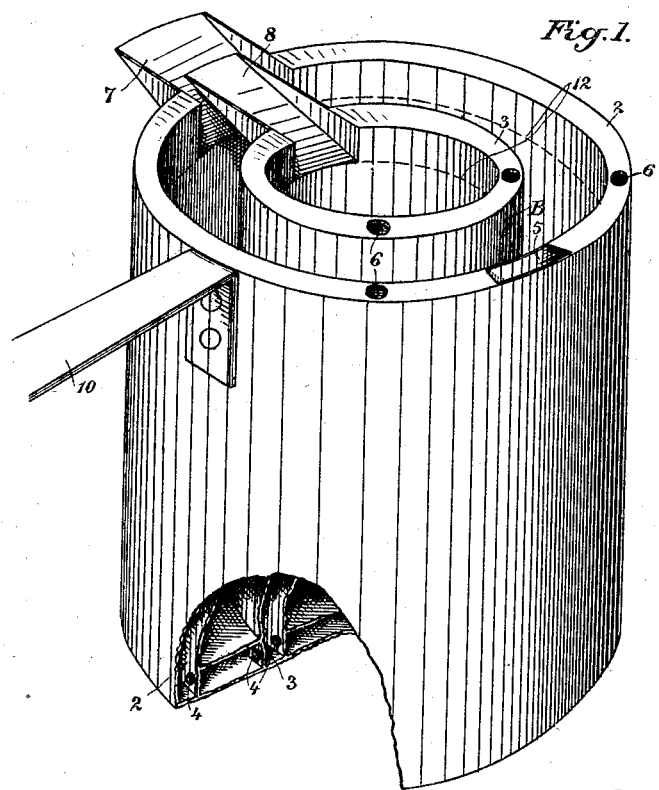
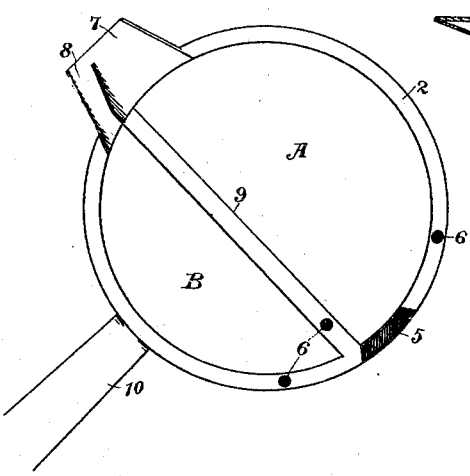
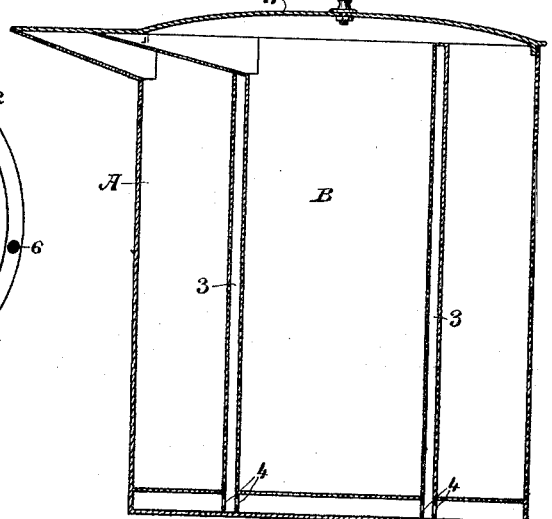
Witnesses,
Inventor,
John C. F. McGriff

UNITED STATES PATENT OFFICE.

JOHN C. F. McGRIFF, OF SAN JOSE, CALIFORNIA.

COMBINATION LIQUID MEASURE AND STERILIZER.

SPECIFICATION forming part of Letters Patent No. 695,167, dated March 11, 1902.

Application filed March 29, 1901. Serial No. 53,402. (No model.)

*To all whom it may concern:*

Be it known that I, JOHN C. F. McGRIFF, a citizen of the United States, residing at San Jose, county of Santa Clara, State of California, have invented an Improvement in Combination Liquid Measures and Sterilizers; and I hereby declare the following to be a full, clear, and exact description of the same.

My invention relates to a measure for liquids; and it consists of compartments formed in a single structure whereby different quantities of liquid may be measured in the different compartments and the combination therewith of discharge-passages whereby the liquid from either compartment may be poured through a common discharge, a means for sterilizing milk or other liquid within the measure before it is discharged, and details of construction which will be more fully explained by reference to the accompanying drawings.

Figure 1 is a view of my improved measure with concentric compartments. Fig. 2 shows the measure separated into two unequal parts by a diaphragm and having a discharge-outlet common to both. Fig. 3 is a sectional view showing the outer measure with a single wall.

As shown in Fig. 1, A is the outer vessel, and B the inner one. These vessels bear such relation to each other that the outer one serves for measuring a larger quantity and the inner one a smaller quantity of liquid, as one quart and one pint. Each measure may have an indicating-mark 12, showing the height to which the liquid should stand to equal the amount called for.

In order to sterilize the liquid if milk is being measured, it is desirable to introduce steam or hot water, and thus raise the temperature sufficiently to produce the desired result. For this purpose each of the measures is made with double walls, forming annular chambers 2 and 3 around the outer and inner measure, respectively. These chambers may be connected by passages at the bottom, as at 4, and they have a filling-opening, as at 5, through which the hot water may be introduced and circulated through the annular spaces 2 and 3. As some steam is liable to be generated when the water is very hot, I have shown vent-openings, as at 6, through which the steam may escape. In order to pour the liquid from either of these receptacles, I have shown a nozzle or discharge 7 connected with the larger measure, so that when this measure has been used the liquid can be poured out through this nozzle. The smaller measure has a nozzle 8, which extends from it through the center of the larger discharge 7, and if the smaller chamber has been used for measuring purposes by tilting the vessel the discharge will take place through the smaller nozzle into and through the larger one without flowing into the larger vessel.

In Fig. 2 I have shown the vessel A, having the annular hot-water compartment 2, as before described; but in place of the circular inner vessel I have shown a diaphragm 9, extending across from the side adjacent to the handle 10 to the opposite side. This diaphragm is so placed that the larger compartment, which will hold, say, one quart, is located upon one side and the smaller compartment, to hold a pint, upon the opposite side. The diaphragm 9 is made with double walls, with openings connecting it with the annular exterior space 2, so that when hot water is introduced through the filling-opening 5 it will flow into the annular space and also into this transverse compartment, so that the milk contained in either compartment will be essentially surrounded by the hot water and the sterilizing action will take place, as before described. In this construction the passage 7 connects with the larger compartment and the passage 8 connects with the smaller compartment and leads into and through the passage 7, as previously described. In this manner I provide a common discharge for a plurality of measuring-compartments, either of which can be used independently of the other.

11 is a cover which is adapted to close the top of the apparatus when desired.

Having thus described my invention, what I claim as new, and desire to secure by Letters Patent, is—

1. The combination of an outer vessel and a vessel interior thereto each of said vessels having a pouring-spout with the spout of the interior vessel extending across the space between the walls of the vessels and leading into the spout of the outer vessel.

2. A measuring vessel including a plurality of compartments one contained within the other to form a single structure, each of said compartments having a pouring-spout with the spout of an interior compartment bridging the space between the wall of said compartment and the wall of the one next to it and entering the spout of the latter.

3. A measuring vessel including concentric compartments separated from each other and containing double walls, each of said compartments having a pouring-spout so arranged in line that the spout of the inner compartment bridges the space between the adjacent walls of the compartments and enters, and discharges into, the spout of the outer compartment.

4. A measuring vessel including a plurality of compartments each of said compartments having a discharge-passage extending substantially horizontally from its upper portion and with the passage of one compartment leading into the passage of the other compartment.

5. A measuring vessel having a plurality of compartments with double walls forming chambers for hot water, each of said compartments having a pouring-passage with the passage of one compartment horizontally in line with and entering the passage of another compartment whereby the contents of each of the compartments is delivered through a discharge common to all compartments.

6. A measuring vessel having a plurality of independent compartments, with surrounding connected hot-water chambers, independent pouring-passages leading from each of the compartments, said passages opening into a discharge common to all.

7. A vessel comprising a plurality of compartments, each compartment having inclosing double walls and having separate pouring-passages with the passage of one compartment leading into the passage of the other compartment, and means for introducing a heating medium between said walls and between the bodies of liquid in the compartments.

8. A sterilizing device including an inner and an outer vessel each having double walls, and closures for the upper and lower ends of the spaces between pairs of walls said upper closures having vent-openings and the upper closure of one pair of walls having a filling-opening.

In witness whereof I have hereunto set my hand.

JOHN C. F. McGRIFF.

Witnesses:
  S. H. NOURSE,
  JESSIE C. BRODIE.